US008296154B2

(12) United States Patent
Vandali et al.

(10) Patent No.: US 8,296,154 B2
(45) Date of Patent: Oct. 23, 2012

(54) EMPHASIS OF SHORT-DURATION TRANSIENT SPEECH FEATURES

(75) Inventors: Andrew E. Vandali, Greenvale (AU); Graeme M. Clark, Eltham (AU)

(73) Assignee: Hearworks Pty Limited, East Melbourne, Victoria (AU)

( * ) Notice: Subject to any disclaimer, the term of this patent is extended or adjusted under 35 U.S.C. 154(b) by 432 days.

(21) Appl. No.: 12/260,081

(22) Filed: Oct. 28, 2008

(65) Prior Publication Data

US 2009/0076806 A1 Mar. 19, 2009

Related U.S. Application Data

(63) Continuation of application No. 11/654,578, filed on Jan. 18, 2007, now Pat. No. 7,444,280, which is a continuation of application No. 10/088,334, filed as application No. PCT/AU00/01310 on Oct. 25, 2000, now Pat. No. 7,219,065.

(30) Foreign Application Priority Data

Oct. 26, 1999 (AU) ...................................... PQ3667

(51) Int. Cl.

| | |
|---|---|
| ***G10L 21/00*** | (2006.01) |
| ***G10L 19/00*** | (2006.01) |
| ***G10L 11/06*** | (2006.01) |
| ***G10L 19/14*** | (2006.01) |
| ***G10L 15/04*** | (2006.01) |
| ***G10L 13/06*** | (2006.01) |

(52) U.S. Cl. ..................... 704/278; 704/200.1; 704/214; 704/225; 704/254; 704/267

(58) Field of Classification Search ........................ None
See application file for complete search history.

(56) References Cited

U.S. PATENT DOCUMENTS

| | | | |
|---|---|---|---|
| 4,051,331 | A | 9/1977 | Strong et al. |
| 4,061,875 | A | 12/1977 | Freifeld et al. |
| 4,191,864 | A | 3/1980 | Sopher |
| 4,249,042 | A | 2/1981 | Orban |
| 4,357,497 | A | 11/1982 | Hochmair et al. |
| 4,390,756 | A | 6/1983 | Hoffmann et al. |
| 4,441,202 | A | 4/1984 | Tong et al. |

(Continued)

FOREIGN PATENT DOCUMENTS

AU 1706592 1/1993

(Continued)

OTHER PUBLICATIONS

White, Glenn D., "The Audio Dictionary," University of Washington Press, Seattle, WA (1987), pp. 202-203.

(Continued)

*Primary Examiner* — Matthew Sked
(74) *Attorney, Agent, or Firm* — Kilpatrick, Townsend & Stockton, LLP.

(57) ABSTRACT

A sound processor including a microphone (1), a pre-amplifier (2), a bank of N parallel filters (3), means for detecting short-duration transitions in the envelope signal of each filter channel, and means for applying gain to the outputs of these filter channels in which the gain is related to a function of the second-order derivative of the slow-varying envelope signal in each filter channel, to assist in perception of low-intensity sort-duration speech features in said signal.

67 Claims, 4 Drawing Sheets

U.S. PATENT DOCUMENTS

| | | | |
|---|---|---|---|
| 4,454,609 | A | 6/1984 | Kates |
| 4,515,158 | A | 5/1985 | Patrick et al. |
| 4,536,844 | A | 8/1985 | Lyon |
| 4,593,696 | A | 6/1986 | Hochmair et al. |
| 4,661,981 | A | 4/1987 | Henrickson et al. |
| 4,696,039 | A | 9/1987 | Doddington |
| 4,887,299 | A | 12/1989 | Cummins et al. |
| 4,996,712 | A | 2/1991 | Laurence et al. |
| 5,165,017 | A | 11/1992 | Eddington et al. |
| 5,215,085 | A | 6/1993 | von Wallenberg-Pachaly et al. |
| 5,278,910 | A | 1/1994 | Suzuki et al. |
| 5,278,912 | A | 1/1994 | Waldhauer |
| 5,371,803 | A | 12/1994 | Williamson, III |
| 5,402,498 | A | 3/1995 | Waller, Jr. |
| 5,408,581 | A | 4/1995 | Suzuki et al. |
| 5,488,668 | A | 1/1996 | Waldhauer |
| 5,572,593 | A | 11/1996 | Nejime et al. |
| 5,583,969 | A | 12/1996 | Yoshizumi et al. |
| 5,737,719 | A | 4/1998 | Terry |
| 5,884,260 | A | 3/1999 | Leonhard et al. |
| 5,903,655 | A | 5/1999 | Salmi et al. |
| 5,953,696 | A | 9/1999 | Nishiguchi et al. |
| 5,991,663 | A | 11/1999 | Irlicht et al. |
| 6,064,913 | A | 5/2000 | Irlicht et al. |
| 6,078,838 | A | 6/2000 | Rubinstein |
| 6,104,822 | A | 8/2000 | Melanson et al. |
| 6,308,155 | B1 | 10/2001 | Kingsbury et al. |
| 6,453,287 | B1 * | 9/2002 | Unno et al. .................. 704/219 |
| 6,693,480 | B1 | 2/2004 | Wong |
| 6,732,073 | B1 | 5/2004 | Kluender et al. |
| 6,993,480 | B1 | 1/2006 | Klayman |
| 7,219,065 | B1 | 5/2007 | Vandali et al. |
| 7,444,280 | B2 | 10/2008 | Vandali et al. |

FOREIGN PATENT DOCUMENTS

| | | |
|---|---|---|
| AU | 9217065 | 1/1993 |
| JP | 57-85800 A | 5/1982 |
| JP | 58-184200 A | 10/1983 |
| JP | 1-132395 A | 5/1989 |
| JP | 2002-518912 A | 6/2002 |
| WO | 9425958 | 11/1994 |
| WO | 0131632 | 5/2001 |

OTHER PUBLICATIONS

PCT International Search Report, PCT/AU00/01310; dated Jan. 18, 2001.

PCT Written Opinion, PCT/AU00/01310; dated Jun. 25, 2001.

PCT International Preliminary Examination Report, PCT/AU00/01310, dated Oct. 3, 2001.

Yamada, Y., Sensory Aids for the Hearing Impaired, The Institute of Electronics Information and Communication Engineers, Jul. 23, 1993, vol. 93, No. 156, pp. 31-38.

European Application No. 00972441.0, European Search Report mailed on Jun. 30, 2005, 3 Pages.

European Application No. 00972441.0, Office Action mailed on Oct. 28, 2005, 4 Pages.

European Application No. 00972441.0, Office Action mailed on Apr. 9, 2009, 4 Pages.

U.S. Appl. No. 10/088,334, Notice of Allowance mailed on Nov. 22, 2006, 9 Pages.

U.S. Appl. No. 10/088,334, Office Action mailed on Mar. 15, 2006, 16 Pages.

U.S. Appl. No. 11/654,578, Notice of Allowance mailed on Jun. 23, 2008, 7 Pages.

U.S. Appl. No. 11/654,578, Office Action mailed on Nov. 14, 2007, 18 Pages.

Japanese Application No. 2001-534137, Office Action mailed on Jul. 27, 2010, 3 Pages of Office Action and 5 Pages of English Translation.

* cited by examiner

EMPHASIS OF SHORT-DURATION TRANSIENT SPEECH FEATURES

CROSS-REFERENCE TO RELATED APPLICATIONS

This application is a continuation of U.S. patent application Ser. No. 11/654,578 filed on Jan. 18, 2007, entitled "Emphasis of Short-Duration Transient Speech Features," which is a continuation of U.S. patent application Ser. No. 10/088,334, filed on Jul. 15, 2002, now U.S. Pat. No. 7,219,065, issued May 15, 2007, entitled "Emphasis of Short-Duration Transient Speech Features," which is a national stage application of PCT/AU2000/001310 entitled "Emphasis of Short-Duration Transient Speech Features," filed on Oct. 25, 2000, and which claims priority to Australian Provisional Application PQ 3667, entitled "Emphasis of Short-Duration Transient Speech Features," filed on Oct. 26, 1999, all of which are hereby incorporated by reference herein.

BACKGROUND

1. Field of the Invention

This invention relates to the processing of signals derived from sound stimuli, particularly for the generation of stimuli in auditory prostheses, such as cochlear implants and hearing aids, and in other systems requiring sound processing or encoding.

2. Related Art

Various speech processing strategies have been developed for processing sound signals for use in stimulating auditory prostheses, such as cochlear prostheses and hearing aids. Such strategies focus on particular aspects of speech, such as formants. Other strategies rely on more general channelization and amplitude related selection, such as the Spectral Maxima Sound Processor (SMSP), strategy which is described in greater detail in Australian Patent No, 657959 by the present applicant, the contents of which are incorporated herein by cross reference.

A recurring difficulty with all such sound processing systems is the provision of adequate information to the user to enable optimal perception of speech in the sound stimulus.

SUMMARY

It is an object of the present invention to provide a sound processing strategy to assist in perception of low-intensity short-duration speech features in the sound stimuli.

The invention provides a sound processing device having means for estimating the amplitude envelope of a sound signal in a plurality of spaced frequency channels, means for analyzing the estimated amplitude envelopes over time so as to detect short-duration amplitude transitions in said envelopes, means for increasing the relative amplitude of said short-duration amplitude transitions, including means for determining a rate of change profile over a predetermined time period of said short-duration amplitude transitions, and means for determining from said rate of change profile the size of an increase in relative amplitude applied to said transitions in said sound signal to assist in perception of low-intensity short-duration speech features in said signal.

In a preferred form, the predetermined time period is about 60 ms. The faster/greater the rate of change, on a logarithmic amplitude scale, of said short- duration amplitude transitions, the greater the increase in relative amplitude which is applied to said transitions. Furthermore, rate of change profiles corresponding to short-duration burst transitions receive a greater increase in relative amplitude than do profiles corresponding to onset transitions. In the present specification, a "burst transition" is understood to be a rapid increase followed by a rapid decrease in the amplitude envelope, while an "onset transition" is understood to be a rapid increase followed by a relatively constant level in the amplitude envelope.

The above defined Transient Emphasis strategy has been designed in particular to assist perception of low-intensity short-duration speech features for the severe-to-profound hearing impaired or Cochlear implantees. These speech features typically consist of: i) low-intensity short-duration noise bursts/frication energy that accompany plosive consonants; ii) rapid transitions in frequency of speech formants (in particular the 2nd formant, F2) such as those that accompany articulation of plosive, nasal and other consonants. Improved perception of these features has been found to aid perception of some consonants (namely plosives and nasals) as well as overall speech perception when presented in competing background noise.

The Transient Emphasis strategy is preferably applied as a front-end process to other speech processing systems, particularly hut not exclusively, for stimulating implanted electrode arrays. The currently preferred embodiment of the invention is incorporated into the Spectral Maxima Sound Processor (SMSP) strategy, as referred to above. The combined strategy known as the Transient Emphasis Spectral Maxima (TESM) Sound Processor utilises the transient emphasis strategy to emphasise the SMSP's filter bank outputs prior to selection of the channels with the largest amplitudes.

As with most multi-channel speech processing systems, the input sound signal is divided up into a multitude of frequency channels by using a bank of band-pass filters. The signal envelope is then derived by rectifying and low-pass filtering the signal in these bands. Emphasis of short-duration transitions in the envelope signal for each channel is then carried out. This is done by: i) detection of short-duration (approximately 5 to 60 milliseconds) amplitude variations in the channel envelope typically corresponding to speech features such as noise bursts, formant transitions, and voice onset; and ii) increasing the signal gain during these periods. The gain applied is related to a function of the 2nd order derivative with respect to time of the slow-varying envelope signal (or some similar rule, as described below in the Description of Preferred Embodiment).

During periods of steady state or relatively slow varying levels in the envelope signal (over a period of approximately 60 ms) no gain is applied. During periods where short-duration transition in the envelope signal are detected, the amount of gain applied can typically vary up to about 14 dB. The gain varies depending of the nature of the short-duration transition which can be classified as either of the following, i) A rapid increase followed by a decrease in the signal envelope (over a period of no longer than approximately 60 ms). This typically corresponding to speech features such as the noise-hurst in plosive consonant or the rapid frequency shift of a formant in a consonant-to-vowel or vowel-to-consonant, transition, ii) A rapid increase followed by relatively constant level in the signal envelope which typically corresponds to speech features such as the onset of voicing in a vowel. Short duration speech features classified according to i) are considered to be more important to perception than those classified according to ii) and thus receive relatively twice as much gain. Note, a relatively constant level followed by a rapid decrease in the signal envelope which corresponds to abruption of voicing/sound receive little to no gain.

BRIEF DESCRIPTION OF DRAWINGS

In order that the invention may be more readily understood, one presently preferred embodiment of the invention will now be described with reference to the accompanying drawings in which.

DETAILED DESCRIPTION

Figure 1:
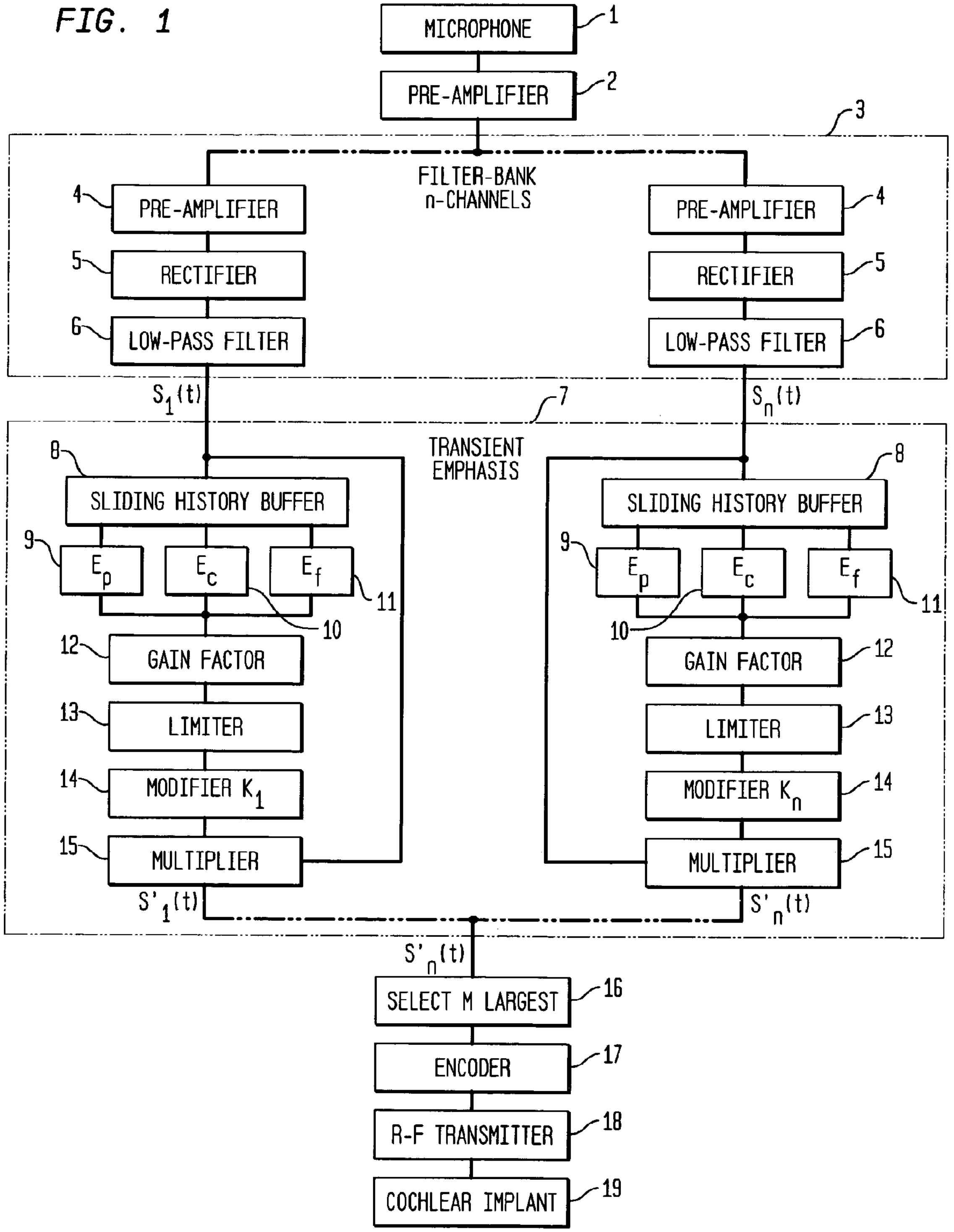
FIG. 1 is a schematic representation of the signal processing applied to the sound signal in accordance with the present invention.

Referring to FIG. 1, the presently preferred embodiment of the invention is described with reference to its use with the SMSP strategy. As with the SMSP strategy, electrical signals corresponding to sound signals received via a microphone 1 and pre-amplifier 2 are processed by a bank of N parallel filters 3 tuned to adjacent frequencies (typically N=16). Each filter channel includes a band-pass filter 4. then a rectifier 5 and low-pass filter 6 to provide an estimate of the signal amplitude (envelope) in each channel. In this embodiment a Fast Fourier Transform (FFT) implementation of the filter bank is employed. The outputs of the N-channel filter bank are modified by the transient emphasis algorithm 7 (as described below) prior to further processing in accordance with the SMSP strategy.

A running history, which spans a period of 60 ms, at 2.5 ms intervals, of the envelope signals in each channel, is maintained in a sliding buffer 8 denoted $S_n(t)$ where the subscript n refers to the channel number and t refers to time relative to the current analysis interval. This buffer is divided up into three consecutive 20 ms time windows and an estimate of the slow-varying envelope signal in each window is obtained by averaging across the terms in the window. The averaging window provides approximate equivalence to a $2^{nd}$-order low-pass filter with a cut-off frequency of 45 Hz and is primarily used to smooth fine envelope structure, such as voicing frequency modulation, and unvoiced noise modulation. Averages from the three windows are therefore estimates of the past ($E_p$) 9, current ($E_c$) 10 and future ($E_f$) 11 slow-varying envelope signal with reference to the mid-point of the buffer $S_n(t)$. The amount of additional gain applied is derived from a function of the slow-varying envelope estimates as per Eq. (1). A derivation and analysis of this function can be found in Appendix A.

$$G=(2\times E_c-2\times E_p-E_f)/(E_c+E_p+E_f) \quad (1)$$

The gain factor (G) 12 for each channel varies with the behaviour of the slow-varying envelope signals such that: (a) short-duration signals which consisted of a rapid rise followed by a rapid fall (over a time period of no longer than approximately 60 ms) in the slow-varying envelope signal produces the greatest values of G. For these types of signals, G could be expected to range from approximately 0 to 2. (b), The onset of long-duration signals which consist of a rapid rise followed by a relatively constant level in the envelope signal produces lower levels of G which typically range from 0 to 0.5. (c) A relatively steady-state or slow varying envelope signal produces negative value of G. (d) A relatively steady-state level followed by a rapid decrease in the envelope signal (i. e. cessation/offset of envelope energy) produces small (less than approximately 0.1) or negative values of G. Because negative values of G could arise, the result of Eq. (1) are limited at 13 such that it can never fall below zero as per Eq. (2).

$$\text{If } (G<0) \text{ then } G=0 \quad (2)$$

Another important property of Eq. (1) is that the gain factor is related to a function of relative differences, rather than absolute levels, in the magnitude of the slow-varying envelope signal. For instance, short-duration peaks in the slow-varying envelope signal of different peak levels but identical peak to valley ratios would be amplified by the same amount.

The gain factors for each channel ($G_n$) where n denotes the channel number, are used to scale the original envelope signals $S_n(t)$ according to Eq. (3), where tm refers to the mid-point of the buffer $S_n(t)$.

$$S'_n(t_m)=S_n(t_m)\times(1+K_n\times G_n) \quad (3)$$

A gain modifier constant ($K_n$) is included at 14 for adjustment of the overall gain of the algorithm. In this embodiment, $K_n$=2 for all n. During periods of little change in the envelope signal of any channel, the gain factor ($G_n$) is equal to zero and thus $S'_n(t_m)=S_n(t_m)$, whereas, during periods of rapid change, $G_n$ could range from 0 to 2 and thus a total of 0 to 14 dB of gain could be applied. Note that because the gain is applied at the midpoint of the envelope signals, an overall delay of approximately 30 ms between the time from input to output of the transient emphasis algorithm is introduced. The modified envelope signals $S'_n(t)$ at 15 replaces the original envelope signals $S'_n(t)$ derived from the filter bank and processing then continues as per the SMSP strategy. As with the SMSP strategy, M of the N channels of $S'_n(t)$ having the largest amplitude at a given instance in time are selected at 16 (typically M=6). This occurs at regular time intervals and for the transient emphasis strategy is typically 2.5 ms. The M selected channels are then used to generate M electrical stimuli 17 of stimulus intensity and electrode number corresponding to the amplitude and frequency of the M selected channels (as per the SMSP strategy). These M stimuli are transmitted to the Cochlear implant 19 via a radio-frequency link 18 and are used to activate M corresponding electrode sites.

Because the transient emphasis algorithm is applied prior to selection of spectral maxima, channels containing low-intensity short-duration signals, which: (a) normally fail below the mapped threshold level of the speech processing system; (b) or are not selected by the SMSP strategy due to the presence of channels containing higher amplitude steady-state signals: are given a greater chance of selection due to their amplification.

Figure 2:
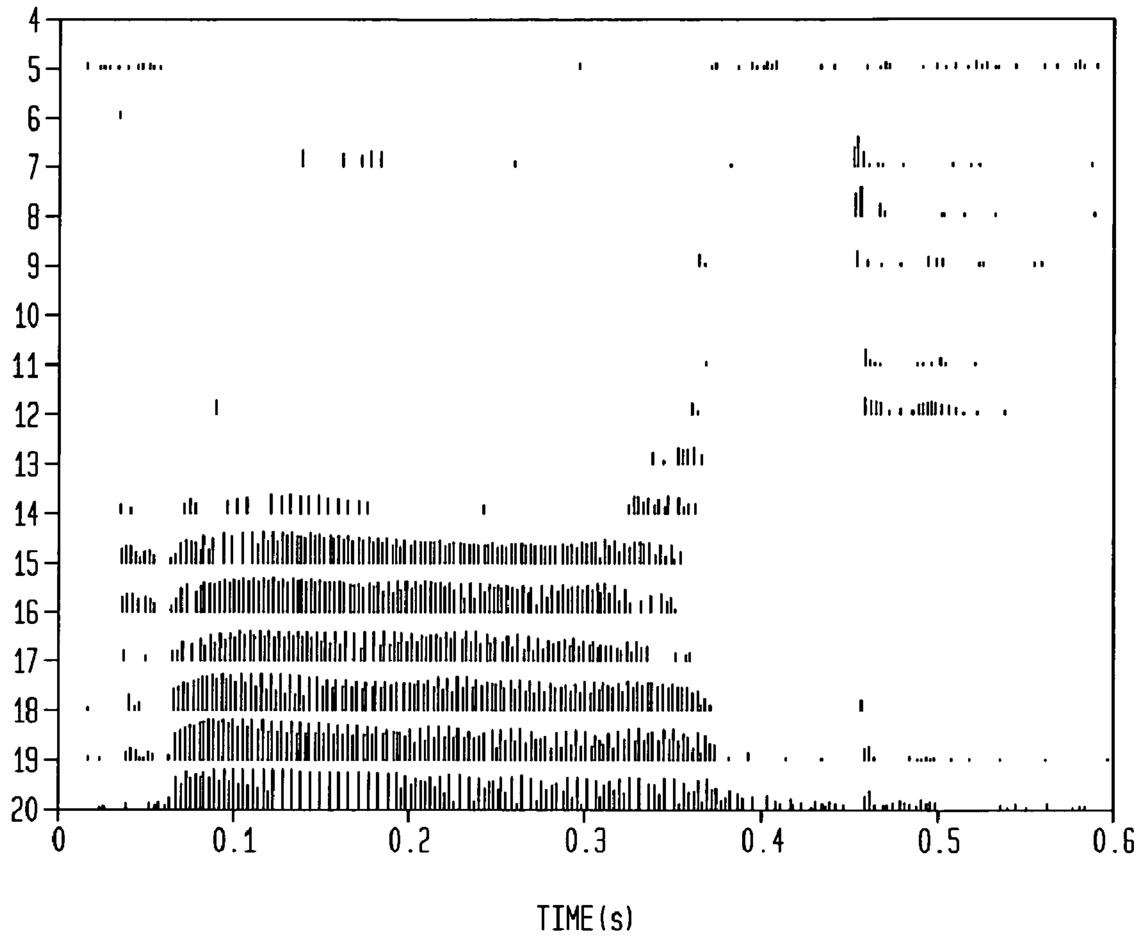
FIGS. 2 and 3 are comparative electrodograms of sound signals to show the effect of the invention.
Figure 3:
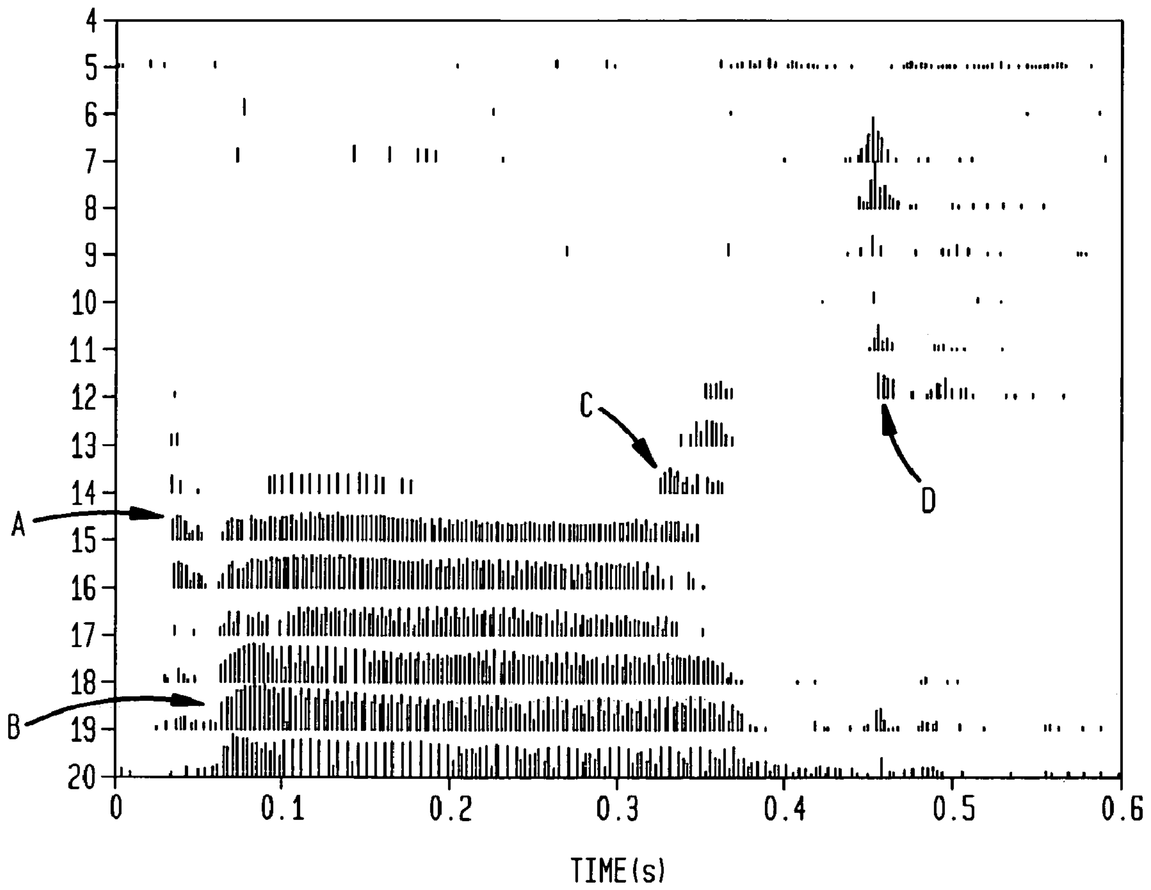

To illustrate the effect of the strategy on the coding of speech signals, stimulus output patterns, known as electrodograms (which are similar to spectrograms for acoustic signals), which plot stimulus intensity per channel as a function of time, were recorded for the SMSP and TESM strategies, and are shown in FIGS. 2 & 3 respectively. The speech token presented in these recordings was /g o d/ and was spoken by a female speaker. The effect of the TESM strategy can be seen in the stimulus intensity and number of electrodes representing the noise burst energy in the initial stop /g/ (point A). The onset of the formant energy in the vowel /o/ has also been emphasised slightly (point B). Most importantly, stimuli representing the second formant transition from the vowel /o/ to the final stop /d/ are also higher in intensity (point C), as are those coding the noise burst energy in the final stop /d/ (point D).

Appendix A: TESM Gain Factor

To derive a function for the gain factor (G) 12 for each channel in terms of the slow-varying envelope signal the following criteria were used. Firstly, the gain factor should be related to a function of the 2nd order derivative of the slow-varying envelope signal. The $2^{nd}$ order derivative is maximally negative for peaks (and maximally positive for valleys) in the slow-varying envelope signal and thus it should be negated; Eq. (A1).

$$G \propto 2\times E_c - E_p - E_f \quad (A1)$$

Secondly, for the case when the 'backward' gradient (i.e. $E_c - E_p$) is positive but small, significant gain as per Eq. (A1) can result when $E_f$ is small (i. e. at the cessation (offset) of envelope energy for a long-duration signal). This effect is not desirable and can be minimised by reducing the backward gradient to near zero or less (i. e. negative) in cases when it is small. However, when the backward gradient is large, Eq. (A11) should hold. A simple solution is to scale $E_{p\ by}$ 2. A function for the modified $2^{nd}$ order derivative is given in Eq. (A2). As $E_p$ approaches $E_c$, G approaches $-E_f$ rather than $E_c \propto E_f$, as in Eq. (A1) and thus the gain factor approaches a small or negative value. However for $E_p << E_c$, G approaches $2\times E_c - E_f$, which is identical to the limiting condition for Eq. (A1).

$$G \propto 2\times E_c - 2\times E_p - E_c \quad (A2)$$

Thirdly, because we are interested in providing gain based on relative rather than absolute differences in the slow-varying envelope signal, the gain factor should be normalised with respect to the average level of slow-varying envelope signal as per Eq. (A3). The effect of the numerator in Eq. (A3) compresses the linear gain factor as defined in Eq. (A2) into a range of 0 to 2. The gain factor is now proportional to the modified $2^{nd}$ order derivative and inversely proportional to the average level of the slow-varying envelope channel signal.

$$G=(2\times E_c - 2\times E_p - E_f)/(E_c + E_p + E_f) \quad (A3)$$

Finally, the gain factor according to Eq. (A3) can fall below zero when $E_c < E_p + E_f/2$. Thus, Eq. (A4) is imposed on $G_{n\ so}$ that the gain is always greater than or equal to zero.

$$\text{If } (G<0) \text{ then } G-0 \quad (A4)$$

An analysis of the limiting cases for the gain factor can be used to describe its behaviour as a function of the slow-varying envelope signal. For the limiting case when $E_{p\ is}$ much smaller than $E_c$ (j. e. during a period of rapid- rise in the envelope signal), Eq. (A3) reduces to:

$$G=(2\times E_c - E_v)/(E_c = E_f) \quad (A5)$$

In this case, if $E_f$ is greater than $E_c$ and approaches $2\times E_c$, (i.e. during a period of steady rise in the slow-varying envelope signal), G approaches zero. If $E_f$ is similar to $E_c$ (i. e. at the end a period of rise for a long-duration signal), G is approximately 0.5. If $E_f$ is a lot smaller than $E_c$ (i.e. at the apex of a rapid-rise which is immediately followed by a rapid fall as is the case for short-duration peak in the envelope signal), G approaches 2, which is the maximum value possible for G.

For the limiting case when $E_f$ is much smaller than $E_c$ Eq. (A3) reduces to:

$$G=(2\times E_c - 2\times E_p)/(E_c + E_p) \quad (A6)$$

In this case, if $E_c$ is similar to $E_p$ (i. e. cessation/offset of envelope for a long-duration signal), G approaches zero. If $E_c$ is much greater than $E_p$ (i. e. at a peak in the envelope), G approaches the maximum gain of 2.

When dealing with speech signals, intensity is typically defined to on a log (dB) scale. It is thus convenient to view the applied gain factor in relation to the gradient of the log-magnitude of the slow-varying envelope signal. Eq. (A3) can be expressed in terms of ratios of the slow-varying envelope signal estimates. Defining the backward magnitude ratio as $R_b = E_c/E_{p\ and}$ the forward magnitude ratio $R_f = E_f/E_c$ gives Eq. (A7).

$$G=(2\times R_b - 2 - R_b \times R_f)/(R_b + 1 + R_b \times R_f) \quad (A7)$$

Figure 4:
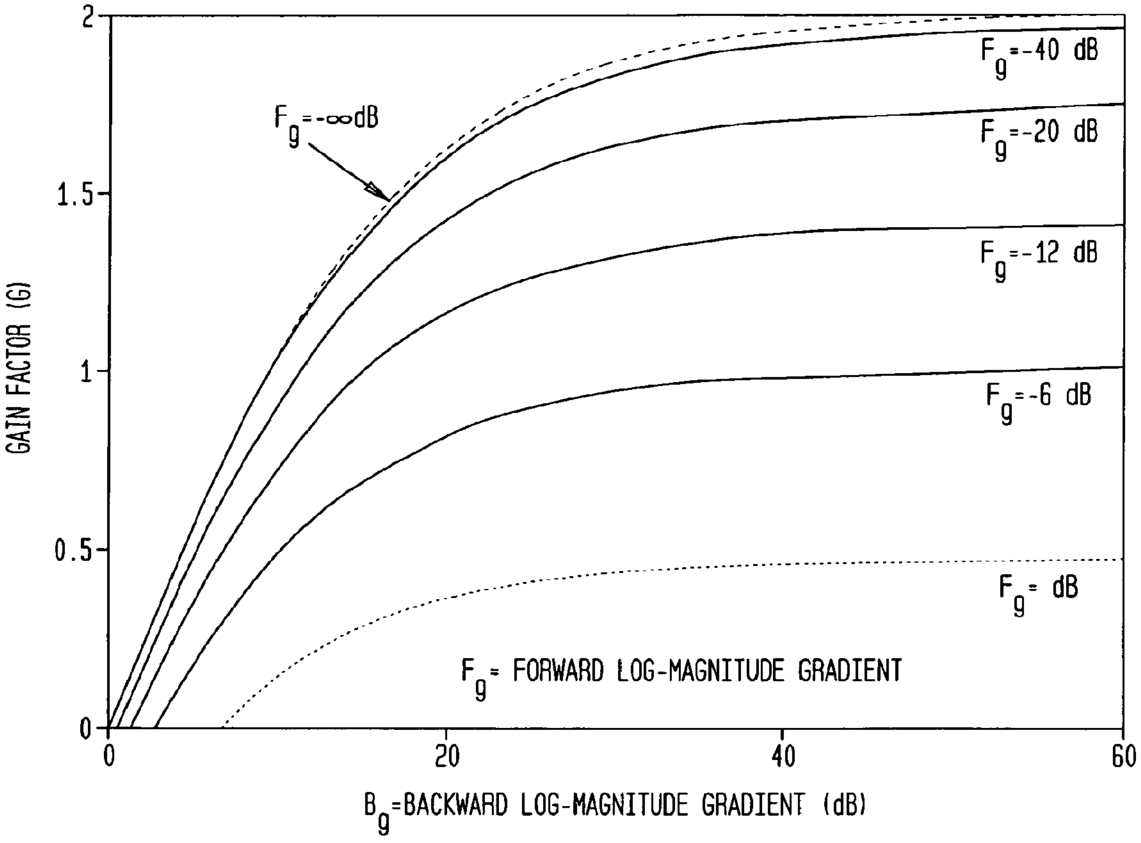
FIG. 4 is a graph illustrating the relationship between gain factor and forward and backward log-magnitude gradients.

The forward and backward magnitude ratios are equivalent to log-magnitude gradients and can be as defined as the difference between log-magnitude terms, i.e. $F_g = \log(E_f) - \log(E_c)$ and $B_g = \log(E_c) - \log(E_p)$ respectively. The relationship between gain factor and forward and backward log-magnitude gradients is shown in FIG. 4. In FIG. 4, linear gain is plotted on the ordinate and backward log-magnitude gradient (in dB) is plotted on the abscissa. The gain factor is plotted for different levels of the forward log-magnitude gradient in each of the curves. For any value of the forward log-magnitude gradient, the gain factor reaches some maximum when the backward log-magnitude gradient is approximately 40 dB. The maximum level is dependent on the level of the forward log-magnitude gradient. For the case where the forward log-magnitude gradient is 0 dB, as shown by the dotted line (i.e. at the end a period of rise for a long-duration signal where $E_f = E_c$), the maximum gain possible is 0.5. For the limiting case where the forward log-magnitude gradient is infinitely steep as shown by the dashed line (i.e. rapid-fall in envelope signal where $E_f << E_c$), the maximum gain possible is 2.0. The limiting case for the forward log-magnitude gradient is reached when its gradient is approximately −40 dB.

What is claimed is:

1. A sound processing device comprising:

a filter bank configured to divide a sound input into a plurality of frequency channels, and to derive an amplitude envelope for one of the plurality of frequency channels; and a subsystem configured to detect in the amplitude envelope a short-duration amplitude transition having a rate of change profile, and to emphasize the amplitude transition based on the rate of change profile of the amplitude transition.

2. The device of claim 1, wherein the subsystem is further configured to emphasize the amplitude transition by applying a gain factor to the amplitude transition.

3. The device of claim 2, wherein the subsystem is further configured to apply a gain factor from about 0 to about 2 to an amplitude transition having a rate of change profile comprising a rapid increase in amplitude followed by a rapid decrease in amplitude.

4. The device of claim 2, wherein the subsystem is further configured to apply a gain factor from about 0 to about 0.5 to an amplitude transition having a rate of change profile comprising a rapid increase in amplitude followed by a substantially constant amplitude.

5. The device of claim 2, wherein the subsystem is further configured to apply a gain factor of approximately 0.1 to an amplitude transition having a rate of change profile comprising a substantially constant amplitude followed by a rapid decrease in amplitude.

6. The device of claim 2, wherein the subsystem is further configured to apply a gain factor of approximately 0 to an amplitude transition having a rate of change profile comprising a substantially constant amplitude followed by at least one of a slow increase and a slow decrease in amplitude.

7. The device of claim 1, wherein the subsystem is further configured to emphasize the amplitude transition in proportion to a rate of change of a portion of the amplitude transition.

8. The device of claim 1, wherein the subsystem is further configured to emphasize amplitude transitions having rate of change profiles comprising similar peak to valley ratios by approximately similar amounts.

9. The device of claim 1, wherein the subsystem is further configured to emphasize the amplitude transition based on a function of a $2^{nd}$-order derivative of the amplitude envelope in which the amplitude transition is detected.

10. The device of claim 1, wherein the filter bank further comprises:

a plurality of band pass filters configured to divide the sound input into the plurality of frequency channels.

11. The device of claim 10, wherein the filter bank further comprises a plurality of rectifiers and low pass filters configured to derive amplitude envelopes for each of the plurality of frequency channels.

12. The device of claim 1, wherein the subsystem further comprises:

a sliding buffer configured to maintain a running history of the amplitude envelope, and wherein the subsystem is configured to detect the amplitude transition based on the history maintained in the buffer.

13. The device of claim 12, wherein the subsystem is further configured to determine the rate of change profile of the detected amplitude transition based on the history maintained in the buffer.

14. The device of claim 12, wherein the buffer maintains a running history of approximately 60 ms.

15. The device of claim 1, wherein the rate of change profile of the amplitude transition comprises the change in amplitude of the amplitude transition over a predetermined time period.

16. A method of processing a sound comprising:

dividing the sound into a plurality of frequency channels;

deriving an amplitude envelope for one of the plurality of frequency channels;

detecting in the amplitude envelope a short-duration amplitude transition having a rate of change profile; and emphasizing the amplitude transition based on the rate of change profile of the detected amplitude transition.

17. The method of claim 16, wherein emphasizing the amplitude transition comprises:

applying a gain factor to the amplitude transition.

18. The method of claim 17, further comprising:

applying a gain factor from about 0 to about 2 to an amplitude transition having a rate of change profile comprising a rapid increase in amplitude followed by a rapid decrease in amplitude.

19. The method of claim 17, further comprising:

applying a gain factor from about 0 to about 0.5 to an amplitude transition having a rate of change profile comprising a rapid increase in amplitude followed by a substantially constant amplitude.

20. The method of claim 17, further comprising:

applying a gain factor of approximately 0.1 to an amplitude transition having a rate of change profile comprising a substantially constant amplitude followed by a rapid decrease in amplitude.

21. The method of claim 17, further comprising:

applying a gain factor of approximately 0 to an amplitude transition having a rate of change profile comprising a substantially constant amplitude followed by at least one of a slow increase and a slow decrease in amplitude.

22. The method of claim 16, wherein emphasizing the amplitude transition comprises:

emphasizing the amplitude transition in proportion to a rate of change of a portion of the amplitude transition.

23. The method of claim 16, further comprising:

emphasizing the amplitude transition based on a function of a $2^{nd}$-order derivative of the amplitude envelope in which the amplitude transition is detected.

24. The method of claim 16, further comprising:

deriving amplitude envelopes for a multitude of the plurality of frequency channels.

25. The method of claim 24, further comprising:

detecting a short-duration amplitude transition in each of the multitude of derived amplitude envelopes.

26. The method of claim 25, further comprising:

emphasizing a plurality of the detected amplitude transitions.

27. A device for processing a sound comprising:

means for dividing the sound into a plurality of frequency channels;

means for deriving an amplitude envelope for one of the frequency channels;

means for detecting in the amplitude envelope a short-duration amplitude transition having a rate of change profile; and means for emphasizing the amplitude transition based on the rate of change profile of the detected amplitude transition.

28. The device of claim 27, wherein the means for emphasizing the amplitude transition comprises:

means for applying a gain factor to the amplitude transition.

29. The device of claim 28, further comprising:

means for applying a gain factor from about 0 to about 2 to an amplitude transition having a rate of change profile comprising a rapid increase in amplitude followed by a rapid decrease in amplitude.

30. The device of claim 28, further comprising:

means for applying a gain factor from about 0 to about 0.5 to an amplitude transition having a rate of change profile comprising a rapid increase in amplitude followed by a substantially constant amplitude.

31. The device of claim 28, further comprising:

means for applying a gain factor of approximately 0.1 to an amplitude transition having a rate of change profile comprising a substantially constant amplitude followed by a rapid decrease in amplitude.

32. The device of claim 28, further comprising:

means for applying a gain factor of approximately 0 to an amplitude transition having a rate of change profile comprising a substantially constant amplitude followed by at least one of a slow increase and a slow decrease in amplitude.

33. The device of claim 27, wherein the means for emphasizing the amplitude transition further comprises:

means for emphasizing the amplitude transition in proportion to a rate of change of a portion of the amplitude transition.

34. The device of claim 27, further comprising:

means for emphasizing the amplitude transition based on a function of a $2^{nd}$-order derivative of the amplitude envelope in which the amplitude transition is detected.

35. The device of claim 27, further comprising:

means for deriving amplitude envelopes for a plurality of the frequency channels.

36. The device of claim 35, further comprising:

means for detecting a short-duration amplitude transition in each of the derived amplitude envelopes.

37. The device of claim 36, further comprising:

means for emphasizing a plurality of the detected amplitude transitions.

38. A sound processing device comprising:

a first apparatus configured to detect a short-duration amplitude transition occurring in an amplitude envelope, and to emphasize said detected amplitude transition based on relative differences in amplitude of said amplitude; and a second apparatus configured to derive said at least one amplitude envelope.

39. The sound processing device of claim 38, further comprising:

a second apparatus configured to derive an amplitude envelope for each of a plurality of frequency channels, wherein said first apparatus is configured to detect a short-duration amplitude transition occurring in at least one of said derived amplitude envelopes, and to emphasize said detected amplitude transition based on relative differences in amplitude of said selected amplitude envelope.

40. The sound processing device of claim 39, further comprising:

a device configured to divide a sound input into said plurality of frequency channels.

41. The sound processing device of claim 40, wherein said device configured to divide the sound input comprises: a plurality of band pass filters.

42. The sound processing device of claim 39, wherein said second apparatus further comprises:

a plurality of rectifiers and low pass filters configured to derive said amplitude envelope for each of said plurality of frequency channels.

43. The sound processing device of claim 38, wherein said first apparatus is configured to emphasize said short-duration amplitude transitions by applying a gain factor to said amplitude transitions.

44. The sound processing device of claim 43, wherein said first apparatus further comprises:

at least one sliding buffer configured to maintain a running history of said amplitude envelope in each said frequency channel; and a device configured to determine said gain factor applied to a short-duration amplitude transition based on said history.

45. The sound processing device of claim 41, wherein said gain factor applied to a short-duration transition is related to a function of a $2^{nd}$-order derivative of said selected amplitude envelope having said short-duration amplitude transition.

46. A sound processing device comprising:

a subsystem configured to detect a short-duration amplitude transition for an amplitude envelope, and further configured to emphasize said short-duration amplitude transition based on relative differences in amplitude of said amplitude envelope; and at least one element configured to derive said amplitude envelope.

47. The sound processing device of claim 46, further comprising:

a filter-bank configured to divide a sound input into a multitude of spaced frequency channels, and to derive an amplitude envelope for each of said multitude of frequency channels, wherein said subsystem is configured to detect a short-duration amplitude transition for each of said amplitude envelopes, and further configured to emphasize a selected one of said short-duration amplitude transitions based on relative differences in amplitude of said amplitude envelope having said selected short-duration amplitude transition.

48. The device of claim 47, wherein said filter bank further comprises:

a plurality of band pass filters configured to divide said sound input into said multitude of frequency channels.

49. The device of claim 47, wherein said filter bank further comprises;

a plurality of rectifiers and low pass filters configured to derive said amplitude envelope for each of said frequency channels.

50. The device of claim 46, wherein said subsystem emphasizes said short-duration amplitude transition by applying a gain factor to said short-duration amplitude transition.

51. The device of claim 50, wherein said subsystem further comprises:

a sliding buffer for each of a multitude of spaced frequency channels configured to maintain a running history of said amplitude envelope in said channel; and wherein said subsystem determines said gain factor for each said short-duration amplitude transition in each said frequency channel based on said history maintained in each said buffer.

52. The device of claim 51, wherein said buffer maintains a running history of approximately 60 ms.

53. The device of claim 50, wherein said gain factor is related to a function of a $2^{nd}$-order derivative of the amplitude envelope of each said frequency channel.

54. A sound processing device comprising:

means for detecting a short-duration amplitude transition occurring in an amplitude envelope; and means for emphasizing said detected amplitude transition based on relative differences in amplitude of said amplitude envelope.

55. The sound processing device of claim 54, further comprising:

means for deriving said amplitude envelope.

56. The device of claim 54, wherein means for emphasizing said short-duration amplitude transitions further comprises:

means for applying a gain factor to said short-duration amplitude transitions.

57. A method of processing a sound comprising:

detecting a short-duration amplitude transition occurring in an amplitude envelope; and emphasizing said detected amplitude transition based on relative differences in amplitude of said each amplitude envelope.

58. The method of claim 57, further comprising:

deriving said amplitude envelope.

59. The method of claim 57, wherein emphasizing said short-duration amplitude transitions further comprises:

applying a gain factor to said short duration amplitude transition.

60. A sound processing device comprising:

a first apparatus configured to derive an amplitude envelope for each of a plurality of frequency channels; and a second apparatus configured to detect a short-duration amplitude transition occurring in at least one of said amplitude envelopes, and to emphasize said detected amplitude transition of a selected one or more of said at least one amplitude envelope.

61. The sound processing device of claim 60, wherein for each said selected amplitude envelope, said emphasis is based on relative differences in amplitude of said selected amplitude envelope.

62. The sound processing device of claim 60, further comprising:

a device configured to divide a sound input into said plurality of frequency channels.

63. The sound processing device of claim 62, wherein said device configured to divide the sound input comprises: a plurality of band pass filters.

64. The sound processing device of claim 60, wherein said first apparatus further comprises:

a plurality of rectifiers and low pass filters configured to derive said amplitude envelope for each of said plurality of frequency channels.

65. The sound processing device of claim 60, wherein said second apparatus is configured to emphasize said short-duration amplitude transitions by applying a gain factor to said amplitude transitions.

66. The sound processing device of claim 65, wherein said second apparatus further comprises:

at least one sliding buffer configured to maintain a running history of said amplitude envelope in each said frequency channel; and a device configured to determine said gain factor applied to a short-duration amplitude transition based on said history.

67. The sound processing device of claim 65, wherein said gain factor applied to a short-duration transition is related to a function of a $2^{nd}$-order derivative of said selected amplitude envelope having said short-duration amplitude transition.

* * * * *